United States Patent
Ye

(10) Patent No.: US 9,118,259 B2
(45) Date of Patent: Aug. 25, 2015

(54) PHASE-SHIFTED DUAL-BRIDGE DC/DC CONVERTER WITH WIDE-RANGE ZVS AND ZERO CIRCULATING CURRENT

(75) Inventor: Zhong Ye, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 687 days.

(21) Appl. No.: 12/315,166

(22) Filed: Nov. 28, 2008

(65) Prior Publication Data

US 2009/0196072 A1     Aug. 6, 2009

Related U.S. Application Data

(60) Provisional application No. 61/005,163, filed on Dec. 3, 2007.

(51) Int. Cl.
  *H02M 7/493*  (2007.01)
  *H02M 7/5387*  (2007.01)
  *H02M 3/158*  (2006.01)

(52) U.S. Cl.
  CPC .......... *H02M 7/53871* (2013.01); *H02M 7/493* (2013.01); *H02M 2003/1586* (2013.01)

(58) Field of Classification Search
  CPC ............ H02M 7/493; H02M 7/53871; H02M 2003/1586; H02M 3/335
  USPC ............ 363/15–17, 44–46, 40, 65, 67, 71, 97
  See application file for complete search history.

(56) References Cited

U.S. PATENT DOCUMENTS

| | | | |
|---|---|---|---|
| 5,198,969 A | | 3/1993 | Redl |
| 5,875,103 A | * | 2/1999 | Bhagwat et al. ............... 363/17 |
| 5,946,200 A | | 8/1999 | Kim |
| 6,201,719 B1 | * | 3/2001 | He et al. ........................ 363/72 |
| 6,370,047 B1 | * | 4/2002 | Mallory ........................ 363/65 |
| 6,370,048 B1 | * | 4/2002 | Canter ........................... 363/65 |

(Continued)

FOREIGN PATENT DOCUMENTS

CN     1767336     * 9/2008     ............ H02M 3/155

OTHER PUBLICATIONS

Texas Instruments' application note U-136A, entitled "Phase Shifted Zero Voltage Transition Design Consideration and the UC3875 PWM Controller", published in May 1997.

*Primary Examiner* — Jessica Han
*Assistant Examiner* — Gustavo Rosario Benitez
(74) *Attorney, Agent, or Firm* — William B. Kempler; Frank D. Cimino

(57) ABSTRACT

Disclosed is a family of new DC/DC converters and a new control method. The converter comprises two bridge inverters, two full-wave rectification circuits and a current-doubler filter. Each inverter is able to generate a symmetrical and isolated AC output voltage. Phase-shift control is employed to control the phase difference between the two bridge inverters. By shifting the phase, the converter changes the two inverters' output voltage overlapping area to regulate its output voltage. The bridge inverters always operate at 50% duty cycle, like an open loop Bus Converter, to achieve wide-range zero voltage switching and eliminate circulating current for normal operation. For low output voltage regulation and soft start, Pulse Width Modulation (PWM) control is used. The converters and the control method improve power conversion efficiency, maximize magnetic component utilization, reduce semiconductor stress and decrease EMI emission.

15 Claims, 10 Drawing Sheets

(56) References Cited

U.S. PATENT DOCUMENTS

| | | |
|---|---|---|
| 6,496,396 B2 | 12/2002 | Davila et al. |
| 6,611,444 B2 * | 8/2003 | Ayyanar et al. ............... 363/132 |
| 6,992,902 B2 * | 1/2006 | Jang et al. ...................... 363/17 |
| 7,652,459 B2 * | 1/2010 | Abu Qahouq et al. ......... 323/283 |
| 8,120,336 B2 * | 2/2012 | Mehas et al. ................... 323/224 |
| 2006/0076904 A1 * | 4/2006 | Wiedemuth et al. ........... 315/291 |
| 2007/0047275 A1 * | 3/2007 | Hesterman et al. ............. 363/95 |

* cited by examiner

PHASE-SHIFTED DUAL-BRIDGE DC/DC CONVERTER WITH WIDE-RANGE ZVS AND ZERO CIRCULATING CURRENT

CROSS-REFERENCE TO RELATED APPLICATIONS

This application claims the benefit of provisional patent application Ser. No. 61/005,163, filed on 2007 Dec. 3 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates in general to power converters and, more specifically, to a dual half-bridge DC/DC converter and a dual full-bridge DC/DC converter with dual power transformers, PWM and Phase-Shift controls and capabilities of wide-range ZVS and zero circulating current.

2. Prior Art

In the field of power conversion, it is a common practice to convert electrical energy from one DC voltage level to the other isolated levels by using high frequency switching technology. The application of switching technology dramatically decreases the size of power converters and improves power conversion efficiency. While enjoying the benefits of switching technology, industry is facing new challenges of the further demands of higher power conversion efficiency and smaller sizes of converters, and lower Electromagnetic Inference (EMI) emission, which is caused by switched currents and voltages.

In order to improve converter efficiency, reduce the size of converters and minimize EMI, tremendous effort has been made on four areas: 1. Wide-range Zero Voltage Switching (ZVS), 2. Circulating current elimination, 3. Recovery of the energy resulted from the reverse recovery of output rectifier devices, and 4. Output rectifiers' voltage ringing elimination or clamping; and many topologies have been well developed, which include full-bridge converters with phase-shift control or Pulse Width Modulation (PWM) control, asymmetrical half-bridge converters, etc. One of the most popular topologies is the phase-shifted full-bridge DC/DC converter, especially for high power applications. Such a circuit is described in detail in a Texas Instruments' application note U-136A, entitled "Phase Shifted Zero Voltage Transition Design Consideration and the UC3875 PWM Controller", published in May 1997. The phase-shifted full-bridge DC/DC converter herein described relies on the primary current including power transformer's magnetizing current and the current reflected from the secondary to charge or discharge the parasitic capacitive elements of switching devices of the bridge's lagging leg, and the circulating current and its corresponding energy stored in the transformer leakage inductance to energize a resonation between the capacitive elements of the leading leg's switching devices and the leakage inductance. When the secondary output current reaches a certain level, the switching devices' parasitic capacitance can be fully charged or discharged during the dead time of gate signals. The switching devices can be such controlled that they are turned on after the voltages across the devices decrease to zero. This switching technique is the so-called Zero Voltage Switching. Since there is no capacitance energy discharged into the turning-on devices, such a control essentially eliminates the switching loss in certain heavy load range. But in the rest load range, the switches have to be turned on with certain voltage across the devices, and the energy stored in the parasitic capacitive elements eventually dissipates into the switching devices. This non-zero voltage switching results in part of switching losses and more EMI emission. At light load, especially zero load, effective switching duty cycle and the corresponding voltage-second applying to the power transformer usually reduce when the current in the output filter inductor gets into discontinued conduction mode. In the scenario, neither the primary current reflected from the secondary nor the magnetizing current can substantially reduce the voltage across the switches to be turned on and the switching could result in a significant power loss. Moreover, the topology did little to recycle the leakage inductance energy caused by the reverse recovery of output rectifier diodes, and to clamp the voltage ringing resulted from the free-running leakage inductance energy at both the primary and secondary. Eventually, part of the leakage inductance energy is dissipated in the form of heat inside the power train and the rest is radiated into space in the form of electric and magnetic fields. It could herefrom cause both thermal and EMI problems.

To mitigate the problems above, a simple but effective clamping circuit was invented by Richard Redl, et al, and detailed in U.S. Pat. No. 5,198,969. The node connecting one end of a power transformer primary winding and one end of a resonance inductor is clamped to positive and negative terminals of a DC input by two cascaded diodes. The clamping circuit with the resonance inductor reduces the transient current caused by the reserve recovery of output rectifiers, captures most of the transient energy on its primary side, and minimizes the voltage ringing on both the primary side and secondary side significantly. The captured energy in the form of a current flowing through the resonance inductor circulates inside the loop comprising the inductor, one of the clamping diodes and one switch. While circulating inside the loop, part of the energy is dissipated because of the voltage drop among the devices. The rest energy, if any, can be utilized for resonation and recycled back to the DC source when the switch shorting the loop is turned off. At the cost of duty cycle loss, the transient current can be minimized by using a larger resonance inductance to reduce the current slew rate at the output rectifiers, and circuit efficiency, to some degree, could be increased. The use of a larger resonance inductance can also extend ZVS to a lighter load.

To further extend ZVS range, a lot of circuits have also been invented. The circuits can be categorized into two types: one is an active switch-controlled resonance network. The auxiliary switch is usually turned on at zero current. It activates a resonation to create a zero voltage condition for main switches to be turned on. The other is simply a LC network connecting to the bridge switches. The network produces a load-independent resonant current, which helps the bridge switches to achieve ZVS in a wide range of loads. One of the examples is the circuit invented by Pradeep Madhay Bhagwat, and the related United States patent is U.S. Pat. No. 5,875,103, entitled "Full Range Soft-Switching DC-DC Converter". These circuits indeed increase the ZVS range. However they didn't address the other problems mentioned above.

A load-dependent circulating current is one of the major drawbacks of the existing ZVS full-bridge DC/DC converters. The circulating current passes through most of the power train of the full-bridge DC/DC converter, including two bridge switches, a resonance inductor, if any, power transformer primary and secondary windings and output rectifiers, when both top or bottom switches are turned on. During this period, no energy is transferred from the primary side to the secondary side. This circulating current causes a substantial power loss. The circuit, introduced in the U.S. Pat. No. 5,946, 200 with a title of "Circulating Current Free Type High Frequency Soft Switching Pulse Width Modulated Full Bridge DC/DC Converter", eliminates the circulating current by using a resonance network on the secondary side to completely draw the circulating energy and herewith the circulating current out of the power train and discharge it to its DC output. Therefore, it minimizes the power loss related to the circulating current. However, the resonance network also removes the necessary circulating energy to accomplish ZVS, and its leading leg switches have to turn on with a near full DC bus voltage across their parasitic capacitances, which will result in some power losses and could cause EMI problems. Because of this reason, some switching devices with high parasitic capacitance, like MOSFETs (metal-oxide silicon field-effect transistors), may not be suitable for this topology. Another disadvantage is that, compared with the full-bridge DC/DC converter with clamping diodes invented by Richard Redl, et al., this circuit has a much higher reverse voltage across the output rectifiers, especially at startup, because of the resonation of the resonance network.

Another way to eliminate the circulating current is to use asymmetrical control. The topologies which can utilize such a control include an asymmetrical half-bridge DC/DC converter and an asymmetrical full-bridge DC/DC converter. An application of asymmetrical half-bridge DC/DC converters was detailed in U.S. Pat. No. 6,496,396 "Reverse Recovery Circuit, Method of Operation Thereof And Asymmetrical Half-bridge Power Converter". Asymmetrical bridge DC/DC converters could work quite well under some conditions. The conditions include low input variation, low output DC voltage regulation range and small or slow step load changes. If the conditions can not be met, the circuit could get into a severe asymmetrical mode, where soft switching could lose and the current stress of the bridge switches and voltage stress of the output rectifiers increase. Furthermore, since the primary current passes through the bridge capacitor(s), the capacitance value needs to be relatively large, and therefore the capacitor's voltage may not change fast enough to follow PWM duty cycle's change during a large step load response. A large step load could easily cause power transformer saturation. Because of this reason, asymmetrical bridge DC/DC converters are not suitable for high power applications and their bandwidths are usually lower than those of conventional bridge DC/DC converters.

Although these efforts of the previous arts, to various degrees, mitigate power loss and decrease component stress, there was no successful story of handling all the mentioned problems with one single topology yet. It would such be desirable for industry to have a converter which has a wide-range ZVS capability, always operates at maximum duty cycle, fully utilizes magnetic components, minimizes or eliminates circulating current, recovers reverse recovery energy and well clamps or eliminates the voltage ringing at output rectifiers. This presented invention is going to disclose a new control method and a novel topology in the following sections; by applying the proposed control to the topology, a new family of DC/DC converters were created. The converters are able to operate at a constant 50% duty cycle, like an open loop Bus Converter, while regulating its output voltage, to achieve most, if not all, desirous features listed above and improve overall circuit efficiency and performance to a new level.

SUMMARY OF THE INVENTION

The present invention discloses a family of dual-bridge DC/DC converters, a new control method and a corresponding PWM and phase-shift controller. The DC/DC converters comprise two bridge inverters, each having one power transformer with at least two secondary windings and being able to generate a symmetrical and isolated square or a like AC voltage output, two full-wave rectification circuits, two output inductors and one or multi paralleled output capacitors. The bridge inverters are in either half-bridge configuration or full-bridge configuration. The transformers' secondary windings are typically connected in a central-tapped configuration and the central taps are tied together to Secondary Ground (GNDS) if the output rectification device is a diode. The transformers' secondary windings are tied to GNDS by synchronous switching devices if a synchronous rectification circuit is used instead. Power MOSFET is a common switching device for synchronous rectification application. Each full-wave rectification circuit is fed by two terminals, each connecting to one power transformer. The two rectification circuits and the two output inductors are arranged in a current-doubler configuration for output current ripple cancellation. The PWM and phase-shift controller can generate PWM gate signals for converter soft start, low output voltage regulation and light load output voltage regulation when the converter gets into discontinuous conduction mode (DCM). When the PWM reaches 50% duty cycle and a higher duty cycle is demanded, the controller switches to phase-shift mode and generates phase-shifted gate signals for the two bridge inverters. The controller can have additional gate outputs, which are generated from bridge inverters' gate signals, for synchronous rectification circuit's switching devices. The inverter with a leading phase is referred to as Leading Bridge Inverter, and the other Lagging Bridge Inverter. The converter operates in phase-shift mode for normal operation. By shifting the phase angle between the two bridge inverters, the output voltage of each rectification circuit has a different voltage overlapping area of the two power transformers' outputs and a different zero-voltage area, whereby the converter's output DC voltage can be regulated. In the voltage overlapping areas, the two bridge inverters share their output currents, while in the zero voltage areas, freewheel devices of the rectification circuits take over the output currents, and no circulating current is generated in the power train beyond the point.

The inverters can either be a resonant type, whose primary is a resonant circuit, or a non-resonant type. To better address the spirit of this invention, the dual-bridge converters with non-resonant type of inverters are used as examples, and two different primary side circuit embodiments and two different secondary side circuit embodiments of the converters are presented for the circuit operation description. One DC/DC converter apparatus can be created by any combination of the two primary side embodiments and the two secondary side embodiments.

The embodiments of the primary side circuit are a half-bridge inverter and a full-bridge inverter. For normal operation, the inverters always operate at 50% duty cycle. The magnetizing currents of their power transformers reach a constant and stable peak value at the end of each half switching cycle, assuming there is no magnetic flux walking. When all bridge switches are turned off and commutation starts, the peak magnetizing current and the reflected output current fast charge and discharge the switching devices' parasitic capacitance of both leading and lagging inverters until the voltages across the power transformer windings decreases to zero. After that, the lagging inverter continues its commutation by utilizing its magnetizing energy, while the leading inverter relies on the energy of its power transformer primary leakage inductance. A properly sized magnetizing inductance of a transformer usually can store enough energy for a bridge to achieve ZVS. The lagging inverter can take this advantage and achieve a full-range ZVS. On the other hand, the leading inverter usually needs an extra inductor in addition to transformer primary leakage inductance to store sufficient energy for ZVS operation at light loads. The extra inductor, normally referred to as resonance inductor, is helpful for soft switching, but it could cause a higher voltage spike and more voltage ringing across the output rectification devices. Two series connected diodes may be needed to clamp the node of the power transformer and the resonance inductor connection to positive and negative inputs. While clamping the voltage spike across its power transformer and hence the rectification devices, the circuit also captures most of the transient energy caused by the reverse recovery of rectification devices and minimizes the voltage ringing. Part of the captured energy is dissipated in the power train, but the rest is utilized for ZVS and recycled back to the DC source, and hence the circuit efficiency is improved.

Unlike a conventional ZVS full bridge converter, the voltage swing rate dv/dt of the lagging inverter's switching devices of this invention is not completely load depended. After the voltage across the power transformer reverses its polarity, there is no secondary reflected current in the transformer primary and the transformer windings are essentially open. Disregarding the small leakage inductance's energy, magnetizing current is the only current to fully charge or discharge bridge switching devices' parasitic capacitances at a much slower voltage swing rate dv/dt to accomplish the ZVS. This circuit characteristic minimizes EMI emission at heavy loads, where most EMI problems occur.

The secondary side embodiments are a diode rectification circuit, a synchronous rectification circuit by using switching devices, like MOSFET etc., or their combination. The converter with a diode rectification circuit is usually for high output voltage and high power applications, while the converter with a synchronous rectification circuit is preferably for lower output voltage applications, such as bus converters.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention and its advantages, references will be made in the following Detailed Description Of The Invention to the accompanying drawings, in which.

DRAWINGS

Reference Numerals

| | | | |
|---|---|---|---|
| 10, 110, 210 | converter primary at different levels or configurations | | |
| 20, 320 | converter secondary at different levels or configurations | | |
| 12, 112, 212 | leading bridge inverter at different levels or configurations | | |
| 14, 114, 214 | lagging bridge inverter at different levels or configurations | | |
| 22, 122 | PWM and Phase-Shift Controller at different levels | | |
| 21 | first diode rectification circuit | 23 | second diode rectification circuit |
| 321 | first SynFET rectification circuit | 323 | second SynFET rectification circuit |
| 25 | filter | | |
| 400 | circuit diagram of PWM and Phase-Shift Controller | | |
| 401 | Phase-Shift Controller | | |

DETAILED DESCRIPTION OF THE INVENTION

In the following description, various components and connection nodes will have letter designations and circuit blocks and complicated waveforms will have number designations additionally to make description easier to understand and to simplify the associations between schematic diagrams and waveforms.

Figure 1:
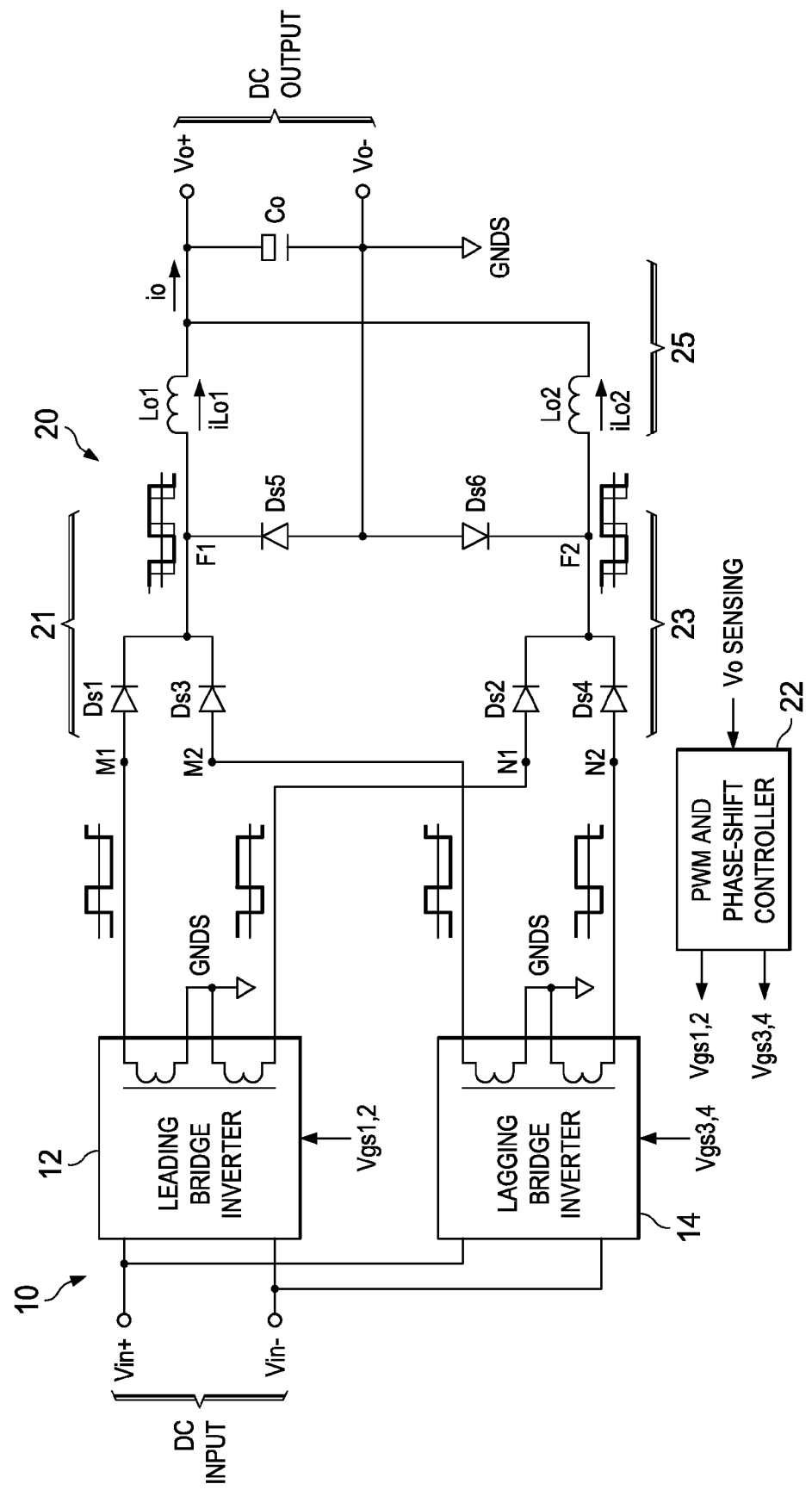
FIG. 1 is a block diagram of a dual-bridge DC/DC converter and its controller.

In FIG. 1, illustrated are a DC/DC converter primary 10 comprising bridge inverters 12 and 14, a DC/DC converter secondary 20 comprising two full-wave rectification circuits 21 and 23 and an output filter 25, and a PWM and Phase-Shift controller 22. The phase of the bridge inverter 12 always leads that of the bridge inverter 14 when a phase-shift control is applied to the converter. Because of the phase relationship, the bridge inverter 12 is referred to as Leading Bridge Inverter and the bridge inverter 14 Lagging Bridge Inverter. The converter primary 10 is connected to a DC source by terminals Vin+ and Vin−. Vin+ is the positive input connected to the positive terminal of the DC source while Vin−, which may be at ground, is the negative input connected to the negative terminal of the DC source. Both the inverters have a power transformer. The two power transformers have a secondary with a center tap and the same turn ratio. The center taps are connected to the negative output, Vo−, which is tied to net GNDS and may be grounded to the earth. The two transformer output terminals, M1 and M2, which preferably have a same reference polarity, are fed to the rectification circuit 21 formed by rectifier diodes Ds1 and Ds3 and free-wheel diode Ds5. The cathodes of Ds1,Ds3 and Ds5 are connected together at node F1. The anode of free-wheel diode Ds5 is tied to GNDS. The other two transformer output terminals, N1 and N2, are fed to the rectification circuit 23 formed by rectifier diodes Ds2 and Ds4 and free-wheel diode Ds6. The cathodes of Ds2,Ds4 and Ds6 are connected at node F2. The anode of free-wheel diode Ds6 is tied to GNDS. Two output inductors Lo1 and Lo2 are connected to Vo+ at one end, and the other ends of the inductors are connected to the nodes F1 and F2 respectively. An output bulk capacitor Co is connected between Vo+ and Vo−. Lo1,Lo2 and Co form a filter 25. A controller 22 has at least one Vo sensing input and bridge switch drive output signals Vgs1,Vgs2,Vgs3 and Vgs4. The controller can smoothly switch between PWM mode and phase-shift control mode.

Figure 2:
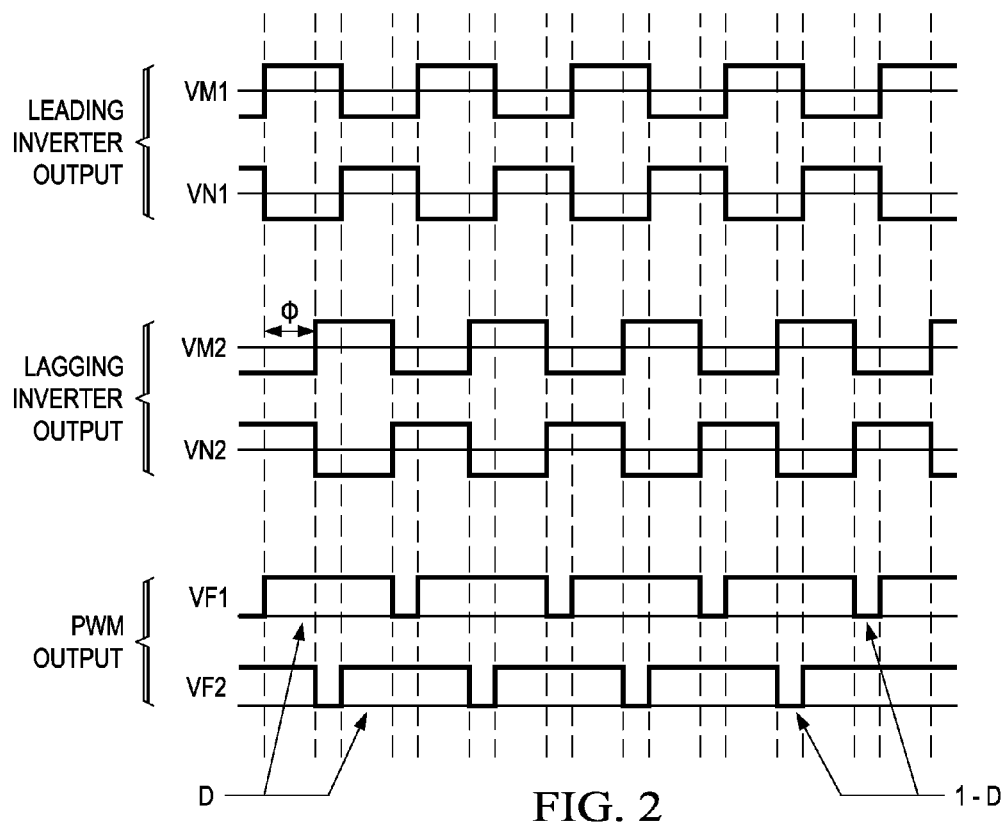
FIG. 2 is a timing diagram of rectified voltage waveforms at output inductors.

In FIG. 2, presented are some key waveforms to illustrate the principle of the circuit operation. Waveforms VM1 and VN1 are the leading inverter output voltages (where VM1 is the voltage of node M1. The same way is used to denote the voltages at nodes F1,F2,M2,N1 and N2). For normal operation, namely Vo>½ of VF1 plateau value, VM1 and VN1 are complementary square waveforms. Waveforms VM2 and VN2 are the lagging inverter output voltages. VM2 and VN2 are also complementary square waveforms. Waveforms VF1 and VF2 are the rectification circuits 21 and 23's outputs when the phase difference of between leading and lagging inverters is φ. It can be seen that Vo can be regulated by changing phase angle φ while each inverter continues to operate at 50% duty cycle. It has been well known that an inverter would operate at its optimal mode when its duty cycle reaches 50%, and this optimal operation mode has been widely used in bus converter design, etc.

Figure 3:
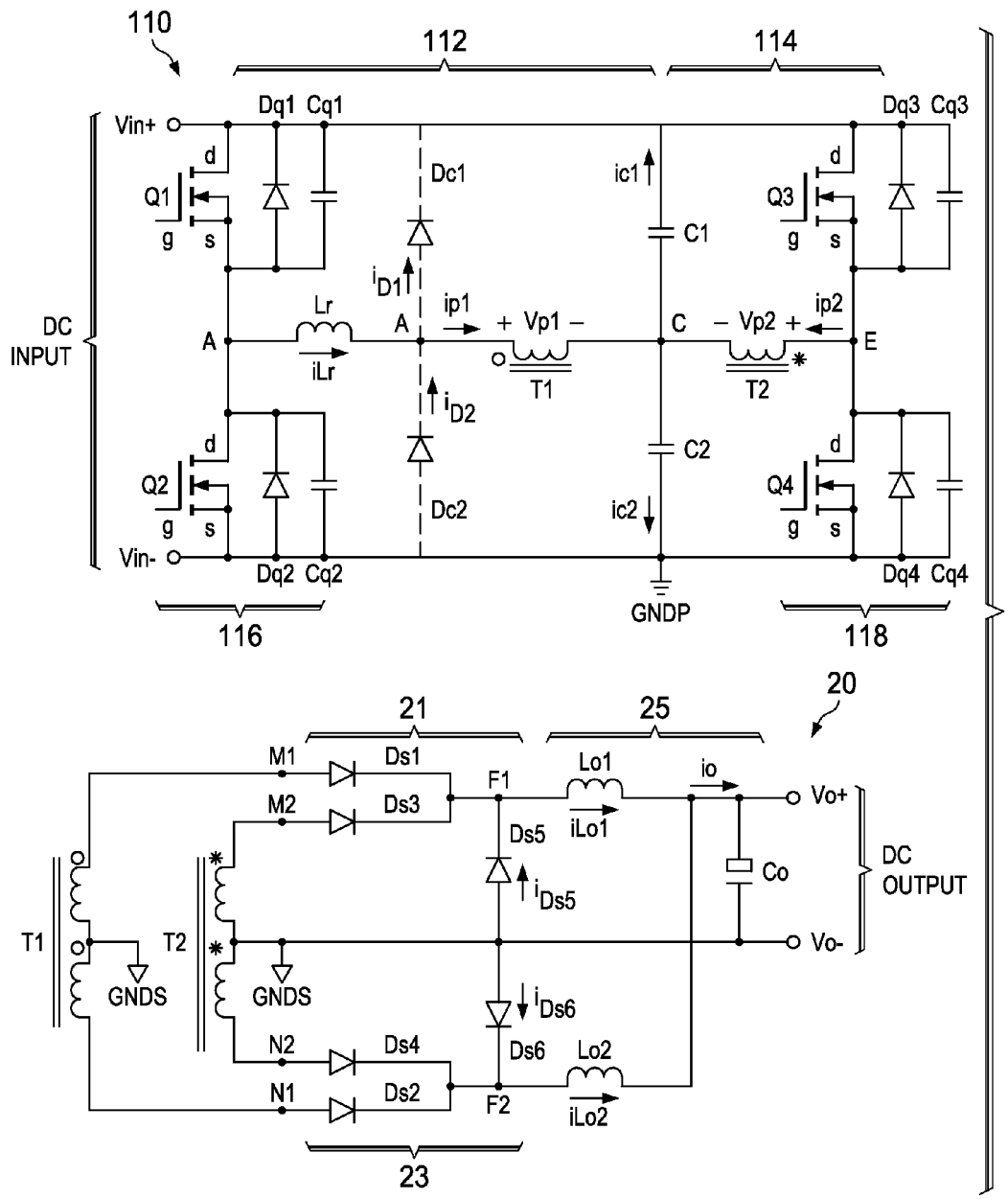
FIG. 3 is a schematic diagram of a dual half-bridge DC/DC converter with a diode rectification output circuit.
Figure 5:
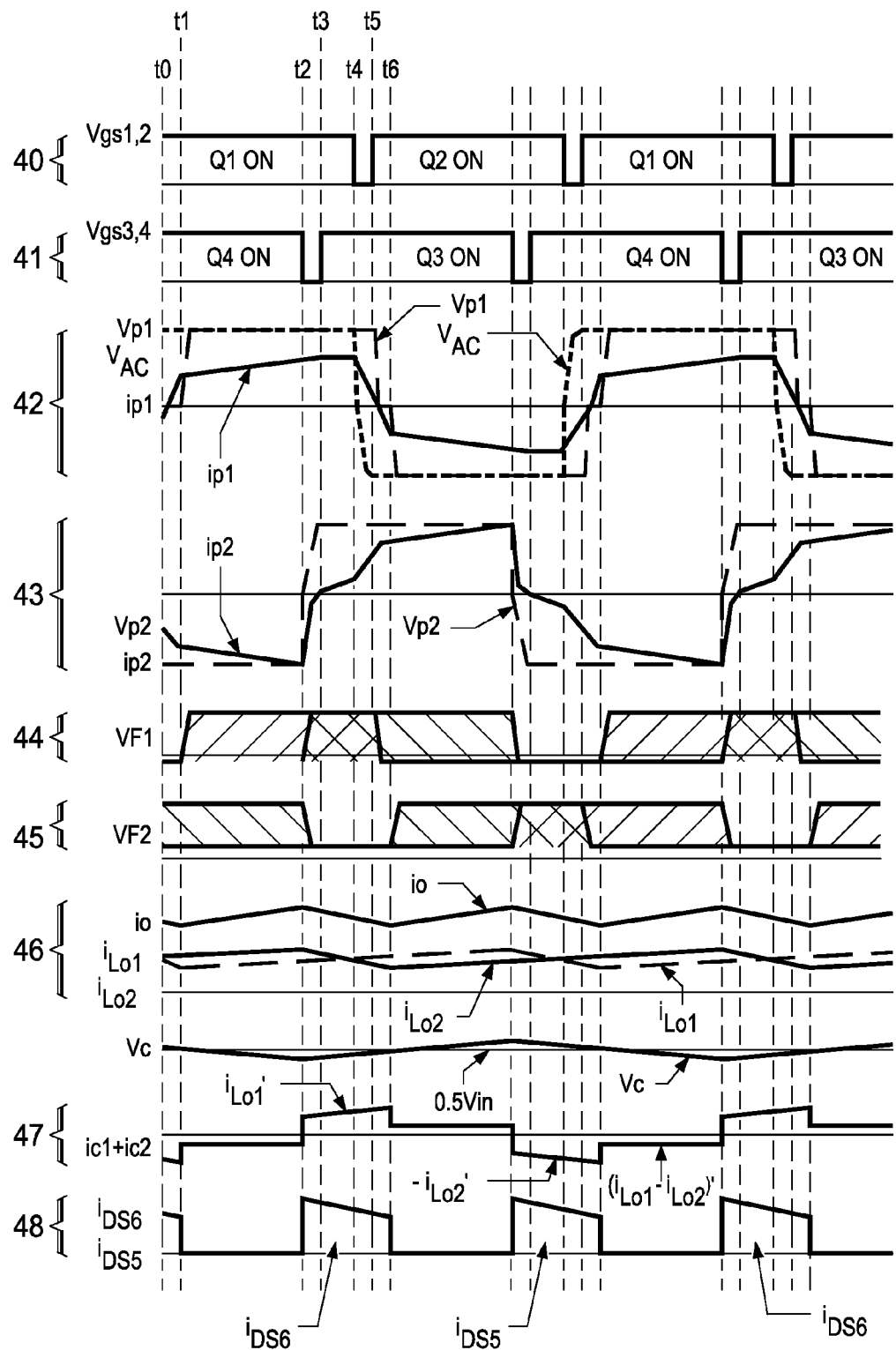
FIG. 5 is a timing diagram of key current and voltage waveforms.

In FIG. 3, illustrated is a dual half-bridge converter with a diode rectification secondary. The converter's primary 110 comprises a leading half-bridge inverter 112 and a lagging half-bridge inverter 114. The leading inverter 112 has a pair of power switches Q1 and Q2 connected in series between the DC input terminals Vin+ and Vin− to form a leg 116 of the leading half-bridge inverter. Dq1 and Dq2 are the body diodes of the power switches Q1 and Q2 respectively. Cq1 and Cq2 are two capacitive elements across Q1 and Q2 respectively, whose values include the switches' parasitic capacitance and external capacitance if any. The power switches can be MOSFETs (metal-oxide silicon field-effect transistor), IGBTs (Isolated Gate Bipolar Transistor) or other semiconductor switching devices. All schematic drawings in this document use MOSFET symbols, but the application should also apply to other types of semiconductor switching devices. A terminal of an inductor Lr is connected to node A, at which Q1 and Q2 are cascaded. The other terminal of the inductor Lr is connected to one end of power transformer T1 at node B. Two clamping diodes Dc1 and Dc2, if needed, are connected in series at node B and between Vin+ and Vin−. The other end of power transformer T1 is connected to two half-bridge capacitors C1 and C2 at node C. C1 and C2 are also connected in series at node C and between Vin+ and Vin−. The lagging inverter 114 has a pair of power switches Q3 and Q4 are connected in series at node E and between the DC input terminals Vin+ and Vin− to form a leg 118 of the lagging half bridge. Dq3 and Dq4 are the body diodes of power switches Q3 and Q4 respectively. Cq3 and Cq4 are two capacitive elements across Q3 and Q4 respectively, whose values include switches' parasitic capacitance and external capacitance if any. One end of power transformer T2 is connected to node E, and the other end of the power transformer is connected to two half-bridge capacitors C1 and C2 at node C. It can be seen that the two half bridges share the bridge capacitors C1 and C2. FIG. 3 only shows a preferable transformer winding connection. Such a connection will allow transformer primary currents Ip1 and Ip2 to cancel each other during the shifted phase when the currents pass through bridge capacitors C1 and C2, whereby it minimizes the RMS currents passing C1 and C2. The waveforms associated with the current cancellation are depicted in FIG. 5 and will be explained in detail later. The other transformer connections are also allowed while being within the scope of the principle described above.

The converter's secondary 20, shown in FIG. 3, has the same diode-based rectification circuit and output filter configurations as shown in FIG. 1. FIG. 3 shows more clearly the connection between power transformers and the rectification circuit, which has been described above in details.

Figure 4A:
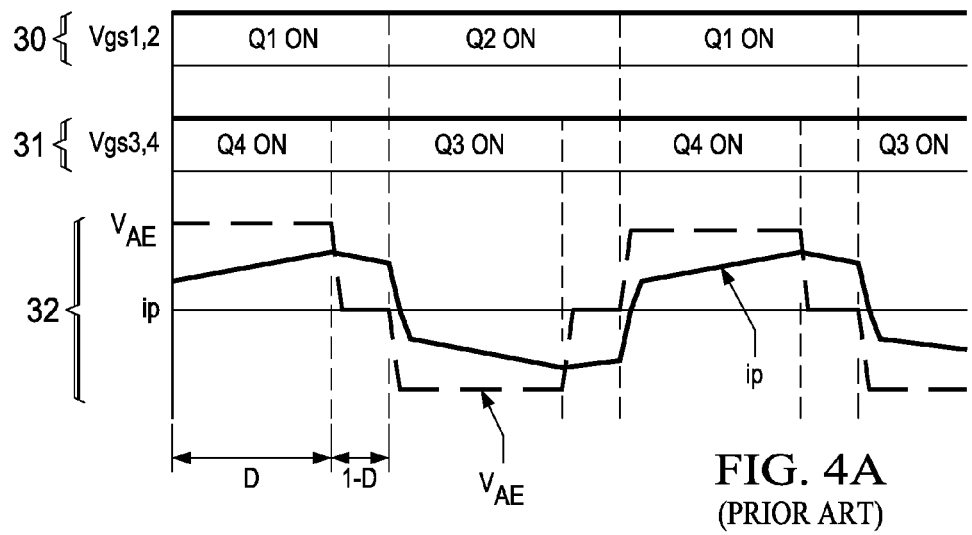
FIG. 4A Typical power transformer primary voltage and current waveforms of a conventional ZVS full-bridge DC/DC converter, as depicted in detail in [1].

FIG. 4A depicts gate signals and typical primary voltage and current waveforms of a conventional ZVS full-bridge DC/DC converter. Vgs1,Vgs2,Vgs3 and Vgs4 are the gate drive signals of power devices Q1,Q2,Q3 and Q4 respectively. Such a full-bridge DC/DC converter transfers energy from the primary to the secondary during D period. During 1-D period, the voltage $V_{AE}$ across the converter's power transformer is essentially zero and no energy is transferred to the secondary side while the circulating current, ip, is still passing most of the power train and causes substantial power loss.

Figure 4B:
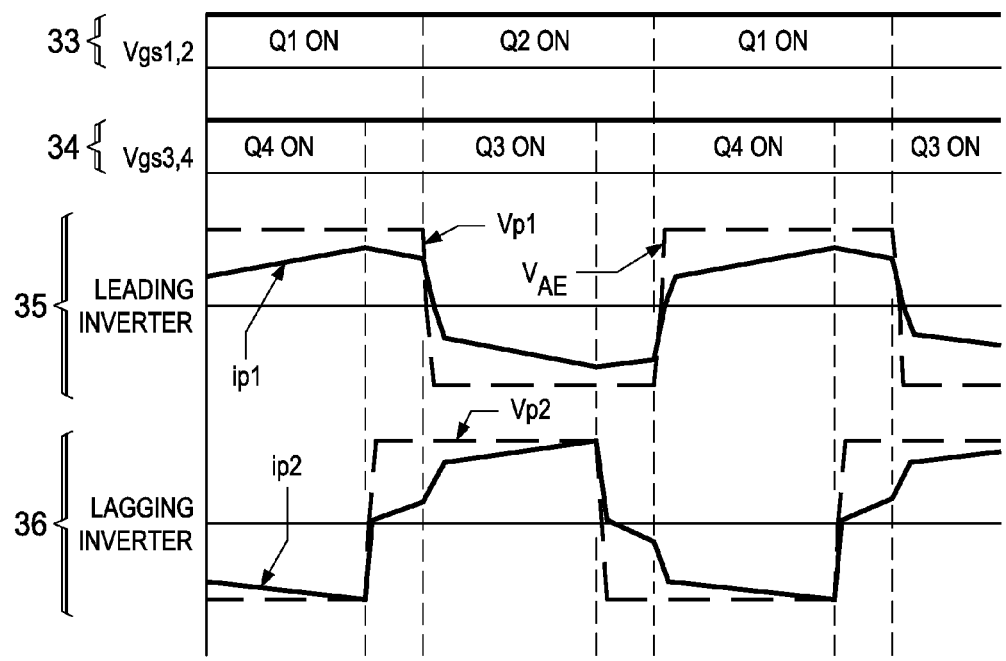
FIG. 4B Typical power transformer primary voltage and current waveforms of a dual-bridge DC/DC converter.

FIG. 4B shows gate signals and the typical primary voltage and current waveforms of a phase-shifted dual-bridge DC/DC converter. Timing Diagram 35 shows the primary voltage and current waveforms of the leading inverter transformer, and Timing Diagram 36 shows the primary voltage and current waveforms of the lagging inverter transformer. It can be seen that both leading and lagging inverters operate at near 50% duty cycle and transformer currents ip1 and ip2 are always in phase with their voltages Vp1 and Vp2. In the other words, the converter transfers energy from the primary to the secondary during both D and 1−D periods. During D period, each inverter delivers half output current since output stages 21, 23 and 25, as shown in FIG. 1, are configured as a current doubler, while in 1−D period both inverters share half output current and the other half current passes free-wheel device Ds5 or Ds6, as shown in FIG. 1. The ability to process power in both D and 1−D periods is the most attractive feature of this inverted circuit. In contrast to a transformer for a conventional ZVS full-bridge converter, which is normally designed at around 80% effective duty cycle, the transformers for this invented converter could use a smaller magnetic core. Since no circulating current exists, transform rms current decreases and two power transformers are used, this topology is especially suitable for high efficiency, high power density and low profile power supply design.

FIG. 5 shows the detailed and expended key waveforms of the dual half-bridge converter, as shown in FIG. 3. The dead time intervals in FIG. 5 are enlarged to better illustrate current and voltage changes during the transition. Waveform 40 shows the gate-to-source voltages of Q1, and Q2. Waveform 41 shows the gate-to-source voltages of Q3, and Q4. Waveforms 42 and 43 show the primary voltages and currents of the leading and lagging half-bridge inverters. Waveforms 44 and 45 are the rectified voltages at nodes F1 and F2. Waveform 46 shows the output inductor currents and a total output current. Waveform 47 shows the currents passing capacitors C1 and C2 and the voltage ripple of the capacitors. Waveform 48 shows the currents passing the free-wheel diodes Ds5 and Ds6. For the convenience of circuit operation descriptions, positive reference polarities of voltages and positive reference directions of currents are designated, as shown in FIG. 3. To better understand the circuit operation, a cycle of 5 time intervals beginning with t1 is described in detail as follows.

1. Period 1 (t1≤t<t2): During this period, switches Q1 and Q4 are on. t1 is the moment when freewheel diode Ds5 ends its reverse recovery. The reverse recovery current of diode Ds5 is reflected to transformer T1's primary and most of the corresponding energy residing in inductor Lr is captured by clamping diode Dc1. The rest energy residing in the primary side and secondary side leakage inductance of transformer T1 can not be captured by clamping diode Dc1, and it could cause some voltage ringing at node N1. To minimize the voltage ringing, the leakage inductance of power transformer T1 should be minimized. The captured current, $i_{D1}$, circulates in the loop formed by Q1, Lr and Dc1 and starts to decline with power losses occurring in the loop. In the mean time, the voltage of C1 is applied to transformer T1's primary, while C2 continues to apply its voltage across transformer T2's primary directly. The voltage of C1 may not be the same as that of C2 during one switching cycle, as shown in waveform 47. The difference is dependent on the switching frequency, transformer turn ratio, load current, output filter inductance and capacitance values of C1 and C2, but usually not significant. The average voltages of C1 and C2, however, are always equal to half of its DC input voltage during a steady state. The voltages of C1 and C2 are coupled to the secondaries of transformers T1 and T2, and then applied to output filter 125 through output rectifiers Ds1 and Ds4 respectively. Energy is transferred from the primary sides to the secondary sides in this time period, and inductor currents $i_{Lo1}$ and $i_{Lo2}$ are increased at a slope which depends on the voltage difference across the inductors and the inductance values.

2. Period 2 (t2≤t≤t3): At t2, transistor Q4 is turned off. After Q4 is turned off, capacitor Cq4 is charged up almost linearly by the reflected Lo2 current, $i_{Lo2}'$. After the voltage of Cq4, VE, is higher than that of C2, the voltage across transformer T2 reverses its polarity and becomes positive. At the same time, the secondary side voltage of T2 at node N2 changes its polarity to negative and freewheel diode Ds6 takes over current $i_{Lo2}$ from Ds4.

The leading bridge maintains its previous state and continues to apply a voltage to node F1 by diode Ds1 while both output rectifiers Ds3 and Ds4 of the lagging bridge remain open. During this period, capacitor Cq4 is continuously charged up by the magnetizing current of transformer T2. As long as the magnetizing current meets the following requirement;

$$Im2 \geq 0.5*Vin*\text{sqt.root}((Cq3+Cq4)/Lm2) \quad (1)$$

where Vin is input DC voltage and Lm2 is magnetizing inductance of transformer T2, the voltage of Cq4 can be fully charged up and then clamped to the input DC source by Q3's body diode, Dq3, before Q3 is turned on at t3. Note that Cq3 is fully discharged when Cq4 is charged up to the DC input voltage, and therefore Q3 is turned on with zero voltage across its parasitic capacitance Cq3. When Cq4 is charged to DC input voltage, transformer T2's output voltage VM2 reaches the same level as transformer T1's output VM1, rectifier diode Ds3 starts to conduct softly, and the leading inverter and lagging inverter begin to share their output current, $i_{Lo1}$. Since the magnetizing current is the only current to charge switch parasitic capacitance Cq4 and discharge switch parasitic capacitance Cq3 after $V_E$ passes the midway of the DC input voltage, and it is usually much smaller than the primary current in most load range, the voltage changing rate of the switches is decreased significantly. This circuit characteristic could greatly reduce EMI, especially at full power where EMI usually reaches its worst point.

3. Period 3 (t3<t<t4): During this period, the two inverters share their output current, $i_{Lo1}$. Since the two transformer outputs, VM1 and VM2, have almost the same voltage, the current shifting from the leading half bridge to the lagging half bridge is usually slow. Therefore, the leading half bridge usually shares more output current during this time period. In the mean time, freewheel diode Ds6 maintains its previous state conducting current $i_{Lo2}$ and $i_{Lo2}$ starts to decrease as Vo applies to Lo2 negatively. The decrease of $i_{Lo2}$ and the increase of $i_{Lo1}$ lead to a current ripple cancellation and it minimizes output current ripple.

4. Period 4 (t4≤t<t5): At t4, Q1 is turned off. Parasitic capacitance Cq2 is discharged and Parasitic capacitance Cq1 is charged by resonance inductor current $i_{Lr}$, which includes the reflected inductor current $i_{Lo1}$ shared by the leading inverter and the captured reverse recovery current of freewheel diode Ds5 during period 1 if any. With the current sharing shifting from the leading inverter to the lagging inverter, $i_{Lr}$ decreases. Before $i_{Lr}$ decreases to the value of the magnetizing current of power transformer T1, diode Ds1 maintains conducting. During this period, Cq2 could be completely discharged when the converter output current reaches a certain level and the resonance inductor Lr stores sufficient energy to accomplish the discharge. If the stored energy is not sufficient, Ds1 turns off softly before parasitic capacitance Cq2 is completely discharged. The voltage across transformer T1, Vp1, starts to decrease and eventually reverses its polarity. Since output inductor current $i_{Lo2}$ still passes Ds6 for continuous conduction mode (CCM), transformer T1's secondary is essentially shorted by Ds2 and Ds6 and therefore T1's magnetizing current can not further contribute to the discharge of Cq2. However, resonance inductor Lr can continue its resonation with Cq1 and Cq2 to fully discharge Cq2. as long as T1's magnetizing current is designed to meet the following criterion;

$$Im1 > 0.5*Vin*\text{sqt.root}((Cq1+Cq2)/Lr) \quad (2)$$

Where Vin is the DC/DC converter's input voltage.
By inserting a proper dead time (t4-t5), Q2 can be turned on at t5 with a zero voltage across its parasitic capacitance.

It should be pointed out that the operating mode of the leading and lagging bridges at a zero load is quite different from the above analyses. At a zero load, both the bridges can operate at a free-running LC resonance mode. Due to this nature of a half bridge, ZVS could be easier to achieve as long as a proper dead time is inserted between two complementary switches.

5. Period 5 (t5≤t<t6): After Q2 is turned on at t5, inductor current $i_{Lr}$ decreases to zero quickly and then starts to build up in an opposite direction. When its reflected current at the secondary surpasses output current $i_{Lo2}$ passing freewheel diode Ds6 and the diode's reverse recovery current, Ds6 starts to open at t6. Since resonance inductor reduces the current changing rate at Ds6 significantly, the reversed recovery current is minimized, and so is its related EMI.

t6 is the ending of a first half cycle and the starting of a second half cycle. The second half cycle repeats all the actions of the first half cycle, but the components involving in the actions are the complementary ones of the first half cycle instead.

It is apparent that, by using phase-shift control, the output voltage regulation range is between the maximum output voltage, which is the plateau voltage of the transformer secondary outputs after the deduction of rectifier forward voltage drop, power train voltage drop and the equivalent voltage loss caused by transience, and 50% of the maximum output voltage. During starting up or under special circumstances which requires output voltage to be less than 50% of its maximum output voltage or where the converter gets into DCM mode at light loads, both half-bridge inverters operate at PWM mode instead of 50% duty cycle control to continue to regulate the converter's output.

Figure 6:
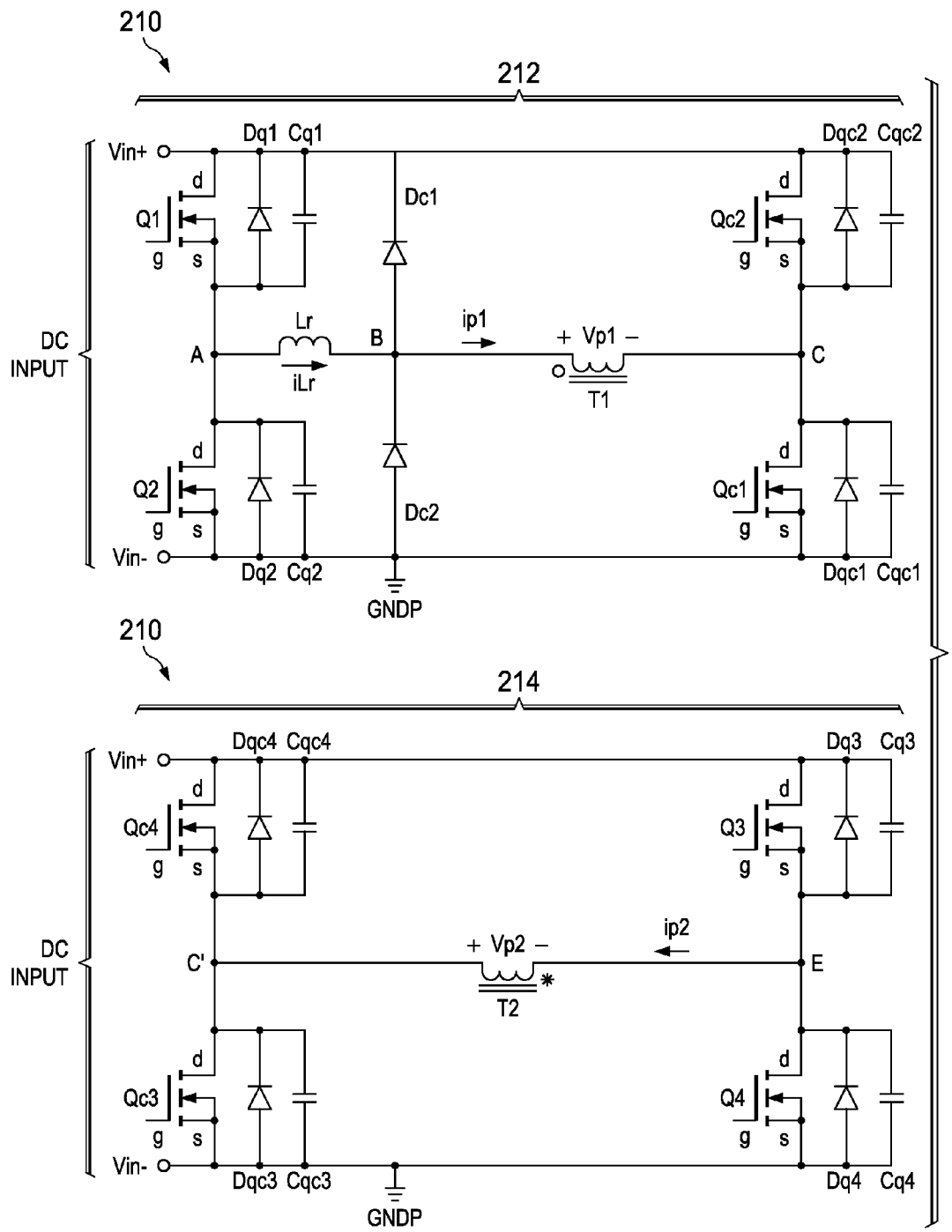
FIG. 6 is a schematic diagram of a dual full-bridge DC/DC converter with a diode rectification output circuit.

In FIG. 6, illustrated is a primary of a dual full-bridge converter. The converter's primary 210 comprises a leading full-bridge inverter 212 and a lagging full-bridge inverter 214. The leading inverter 212 has two pairs of power switches Q1-Q2 and Qc1-Qc2, each of which is connected in series between the DC input terminals Vin+ and Vin− to form two legs of a full bridge. Dq1,Dq2,Dqc1 and Dqc2 are the body diodes of the power switches Q1,Q2,Qc1 and Qc2 respectively. Cq1,Cq2,Cqc1 and Cqc2 are capacitive elements across Q1,Q2,Qc1 and Qc2 respectively, whose values include the switches' parasitic capacitance and external capacitance if any. A terminal of inductor Lr is connected to node A, at which Q1 and Q2 are cascaded. The other terminal of inductor Lr is connected to one end of power transformer T1 at node B. Two clamping diodes Dc1 and Dc2, if needed, are connected in series at node B and between Vin+ and Vin−. The other end of power transformer T1 is connected to node C, at which Qc1 and Qc2 are cascaded.

The lagging inverter, 214, has two pairs of power switches Q3-Q4 and Qc3-Qc4, each of which is connected in series between the DC input terminals Vin+ and Vin− to form two legs of a full bridge. Dq3,Dq4,Dqc3 and Dqc4 are the body diodes of the power switches Q3,Q4,Qc3 and Qc4 respectively. Cq3,Cq4,Cqc3 and Cqc4 are capacitive elements across Q3,Q4,Qc3 and Qc4 respectively, whose values include the switches' parasitic capacitance and external capacitance if any. A terminal of transformer T2 is connected to node E, at which Q3 and Q4 are cascaded. The other terminal of the transformer is connected to node C', at which Qc3 and Qc4 are cascaded.

The power switches can be MOSFETs, IGBTs or other semiconductor switching devices. The sets of switches Q1-Qc1, Q2-Qc2, Q3-Qc3 and Q4-Qc4 are driven by two isolated gate signals derived from Vgs1, Vgs2, Vgs3 and Vgs4 respectively, as shown in FIG. 7 and to be further detailed in the followings.

Figure 7:
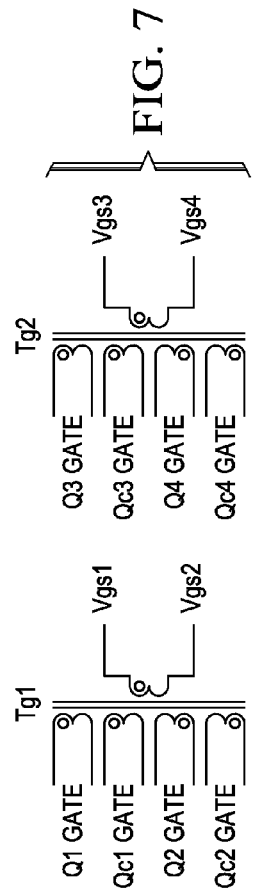
FIG. 7 is a schematic diagram of bridge gate signals of a dual full-bridge DC/DC converter.

FIG. 7 shows a simple way to obtain isolated and complementary gate drive signals by using gate driver transformer Tg1 and Tg2. It can be seen that the gate drive signals for Q1 and Qc1 have the same polarity of (Vgs1-Vgs2), and the gate drive signals of Q2 and Qc2 have the same polarity of (Vgs2-Vgs1), and that the gate drive signals for Q3 and Qc3 have the same polarity of (Vgs3-Vgs4), and the gate drive signals of Q4 and Qc4 have the same polarity of (Vgs4-Vgs3). Vgs1 and Vgs2 are complementary each other for the leading inverter, and Vgs3 and Vgs4 are complementary each other for the lagging inverter. Other circuitry, such as logic circuits combined with low side and high side drivers, can also do the same function, and should be with the scope of this invention.

Each leading inverter and lagging inverter can operate in either PWM mode or Phase-shift mode by itself with a duty cycle less than 50%, while PWM mode is more preferable for the control because of its simplicity. After the inverters' PWM duty cycle reach 50%, the two inverters start phase shifting each other to regulate the output voltage. The same control and gate drive signals used for a dual full-bridge converter can also be used for a dual half-bridge converter by ignoring the gate drive signals for Qc1-Qc4.

Figure 8:
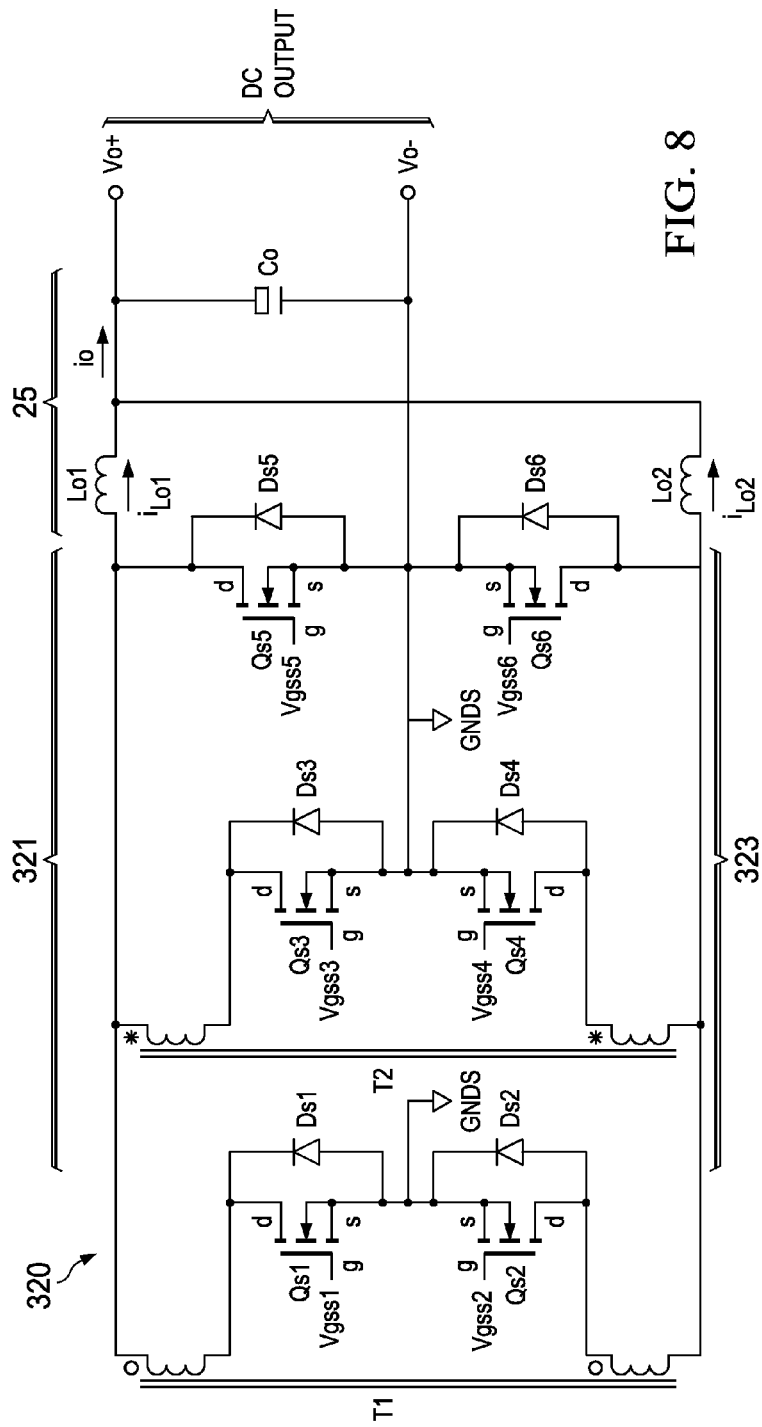
FIG. 8 is a schematic diagram of a synchronous rectification output circuit.

FIG. 8 shows a dual-bridge converter's secondary 320 with synchronous rectification circuits. For low voltage applications, a diode-based rectification circuit could dissipate substantial power and cause thermal problems. Synchronous rectification circuit becomes more and more popular and starts to dominate in the 12V or below output voltage power supply design. The preferable synchronous switching device is a power MOSFET, especially a N-channel power MOSFET. The N-channel FET's Source is usually connected to a circuit Ground, that simplifies gate driver circuit design. The synchronous rectification circuits 321 and 323, shown in FIG. 8, are derived from the diode-based rectification circuits, shown in FIG. 3. By replacing all the diodes with MOSFETs and rearranging the MOSFETs' location, all MOSFETs are now referenced to the secondary ground GNDS. Qs1, Qs2, Qs3 and Qs4 are synchronous MOSFETs (SynFET), and Qs5 and Qs6 replace freewheel diodes Ds5 and Ds6. Ds1-Ds6 can be the body diodes of the MOSFETs or external paralleled diodes. The Sources of MOSFETs Qs1-Qs6 are tied to GNDS. Leading inverter has a power transformer, T1, with two separated transformer secondary windings, and Lagging inverter has a power transformer, T2, also with two separated transformer secondary windings. The Sources of MOSFETs Qs1-Qs6 are tied together to GNDS. The Drains of SynFETs Qs1 and Qs2 are respectively connected to transformer T1's two terminals with opposite reference polarities, and the Drains of SynFETs Qs3 and Qs4 are respectively connected to transformer T2's two terminals with opposite reference polarities also. The other transformer terminals with a same reference polarity are tied to node F1 and F2 respectively. Freewheel MOSFET Qs5's Drain is also tied to F1, and Freewheel MOSFET Qs6's Drain to F2. Output filter 25 comprising Lo1, Lo2 and Co is also connected to nodes F1 and F2. Functionally, the SynFET-based rectification circuit works in the identical way as a diode-based one. The logical relationship among Vgss1-Vgss6 is depicted in FIG. 10 and will be detailed in the followings.

Figure 9:
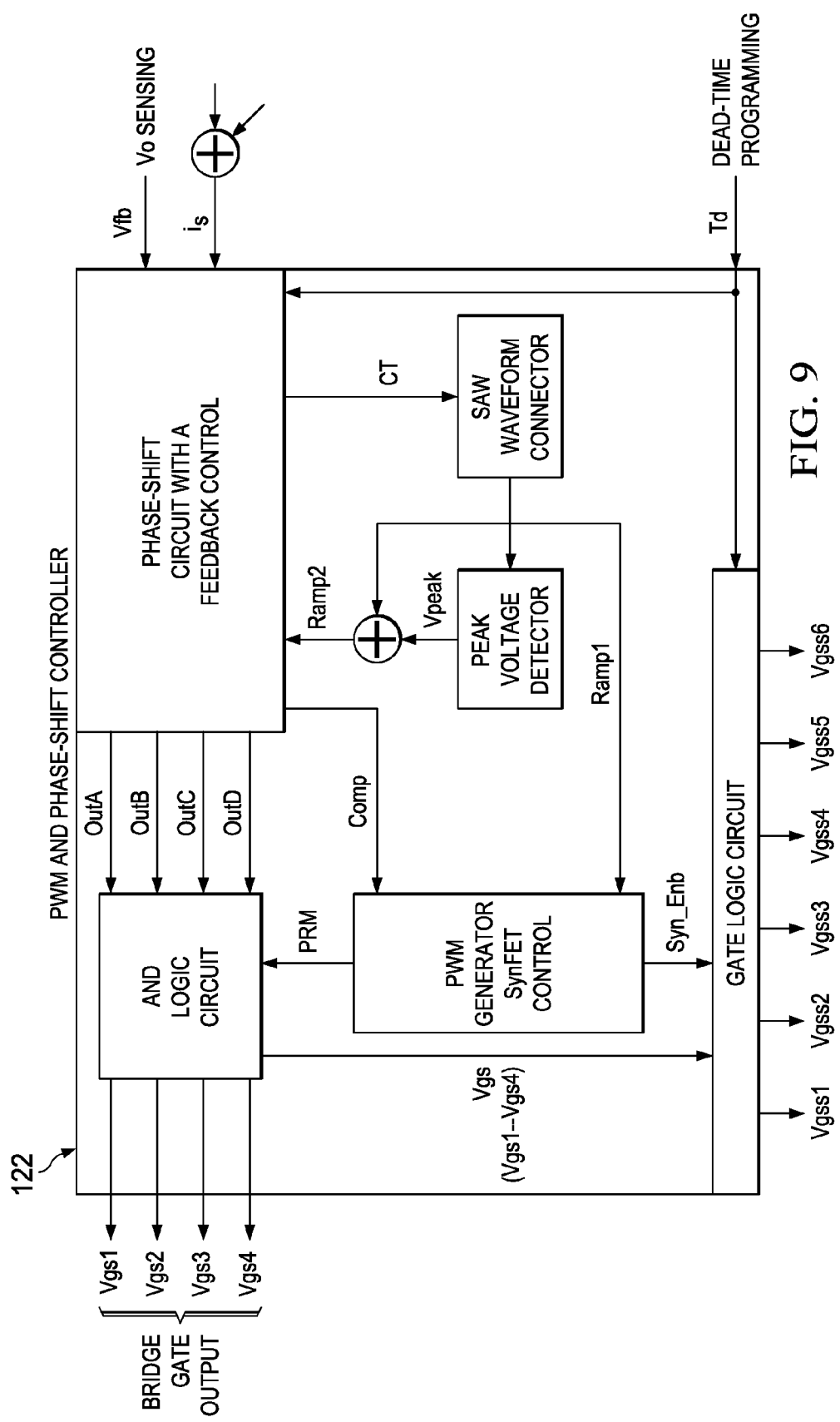
FIG. 9 is a block diagram of a PWM and Phase-Shift Controller

FIG. 9 is a function block diagram of a PWM and Phase-Shift controller. The controller 122 can operate in both PWM and Phase-Shift modes and switch smoothly from one mode to the other. The controller has at least one voltage feedback input, Vfb. It preferably has current sensing input, $i_s$, and dead-time-programming input, Td, also. The current sensing signal, $i_s$, is the summation of rectified transformer primary current signals, |ip1| and |ip2|. It is a re-created output current io signal. Current transformers or other high-voltage current sensors can be used to sense ip1 and ip2. For a dual half-bridge converter, the sensors are preferably located at the power transformer terminals connecting to C1 and C2 to reduce current sensing signals' common-mode noise. A resistor or capacitor is a typical external component connected to Td input for the dead-time programming. The current signal $i_s$ can be used for circuit over-current protection and peak current mode control, where the first level Ramp signal is replaced by the current signal $i_s$ in PWM mode while preferably only the second level Ramp signal is replaced by signal $i_s$ in phase-shift mode (Ramp signals and their levels will be detailed in the followings). The controller should also have at least four gate drive outputs, Vgs1,Vgs2,Vgs3 and Vgs4 for four full-bridge switching devices and preferably has additional gate drive outputs Vgss1-Vgss6 for 4 synFETs and 2 freewheel MOSFETs. To have such functions, the controller should have at least one feedback control circuit, one PWM circuit, one phase-shift circuit and one gate drive logic circuit internally.

Figure 10:
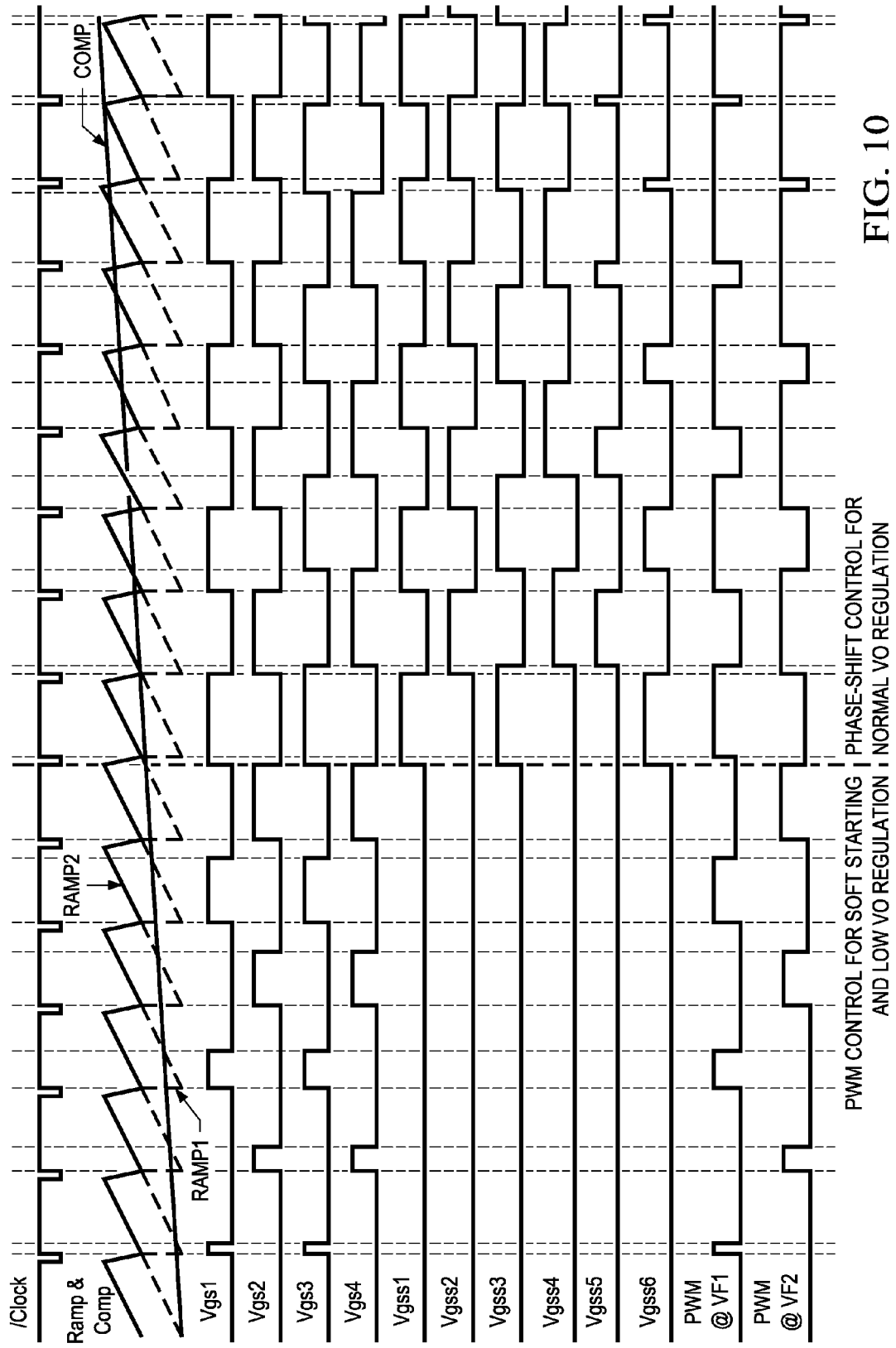
FIG. 10 is a signal timing diagram of the PWM and Phase-Shift Controller

FIG. 10 illustrates typical waveforms of the PWM and Phase-Shift controller. \Clock is the internal clock waveform of the controller, where \ stands for logical inversion. The clock is the heat-beat of the controller. All other signals are referenced to the heat-beat. Ramp & Comp depicts the relationship between duty-cycle command signal, Comp, and Ramp signal. For voltage mode control or average current mode control, the duty-cycle command signal is the error amplifier output of a voltage or average-current feedback loop. Ramp is a triangle signal. The two signals are usually fed to a comparator to generate a desired PWM or phase-shifted gate drive signals. To be able to generate both PWM and Phase-Shifted signals, the ramp preferably has two levels, as shown in FIG. 10. The first ramp level is depicted as a saw waveform in gray fine line and the second ramp level in dark bold line. When the Comp signal is within the first Ramp level, the controller generates PWM gate signals Vgs1-Vgs4, and preferably no synFET and freewheel MOSFET gate signals Vgss1-Vgss6 to avoid unnecessary transient and shoot-through problems. When the Comp signal is high enough and gets into the second ramp level, PWM signals Vgs1-Vgs4 all reach their maximum 50% duty cycle and Vgs3 and Vgs4 start to shift their phases, and synFET and freewheel MOSFET gate signals Vgss1-Vgss6 are enabled to minimize the rectification circuit power loss. Signals Vgss1,Vgss2,Vgss3 and Vgss4 are in phase with Vgs1,Vgs2,Vgs3 and Vgs4 respectively. Vgss5's logic=/(Vgss1+Vgss3) and Vgss6's logic=/(Vgss2+Vgss4), where \ stands for logical inversion. The waveforms shown in this drawing don't have dead-times added. In real circuit or IC chip design, those dead-times are crucial and should be adjusted to avoid switching device shoot through and to provide just enough delay time for soft switching. PWM@VF1 and PWM@VF2 are the voltages at nodes F1 and F2.

Figure 11:
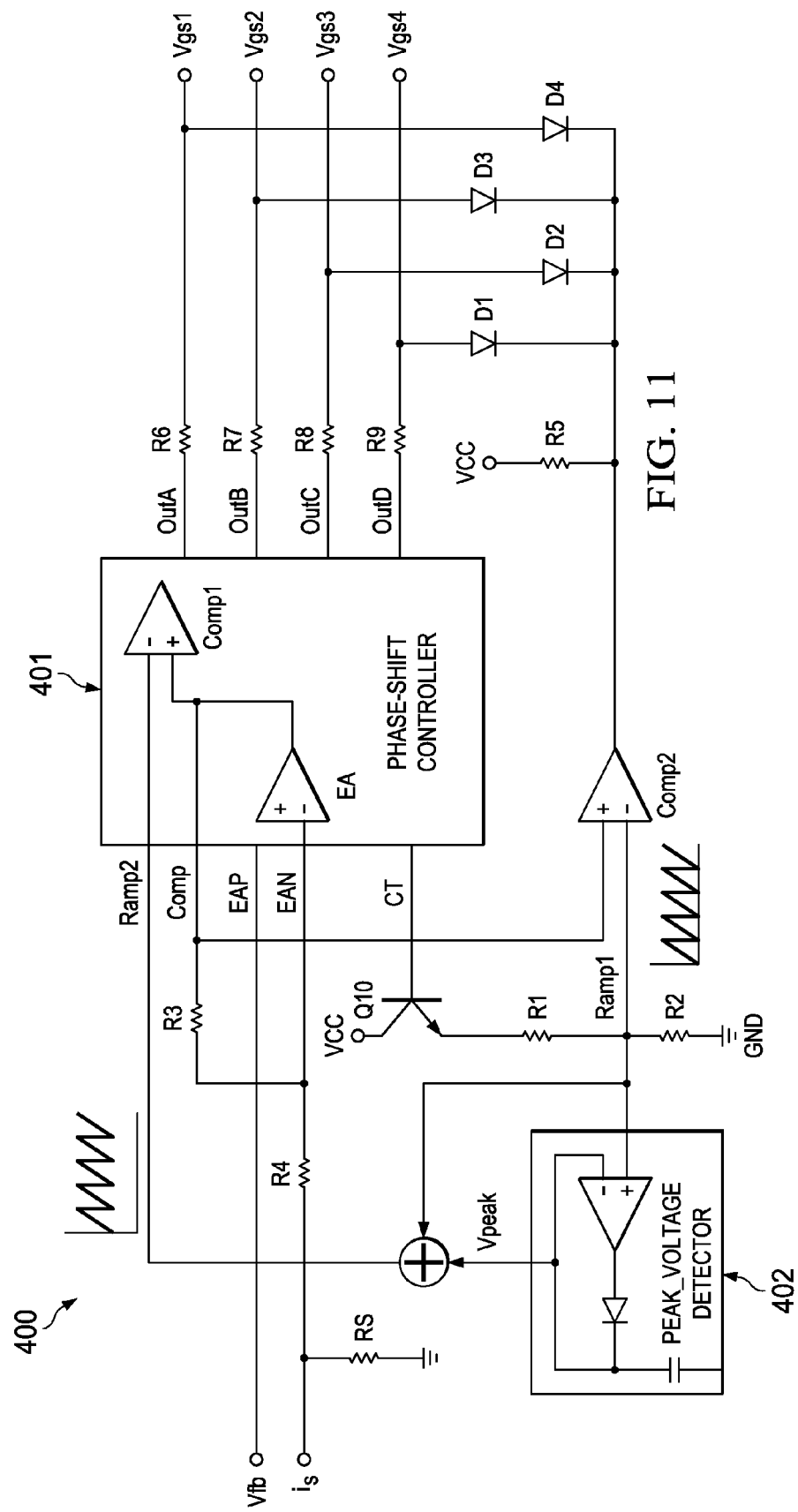
FIG. 11 is a circuit diagram of a PWM and Phase-Shift Controller

FIG. 11 shows a circuit embodiment, which uses an existing phase-shift controller IC, e.g. UCC3895, to implement the functions of PWM and Phase-Shift controls and generate gate drive signals for main switches, as detailed in FIG. 10. The control circuit 400 includes a conventional phase-shift controller 401, a ramp generator comprising a NPN bipolar transistor Q10 and a voltage divider with two resistors R1 and R2, a PWM generator comprising a voltage comparator VCMP2, a pull-up resistor R5 and four pull-down diodes D1,D2,D3 and D4 and a peak-voltage detector 402. A signal Ramp1 is derived from the voltage of controller 401's oscillator timing capacitor CT. The transistor Q10 acts as a voltage follower connecting to the voltage divider. The divider's output is Ramp1. The peak voltage detection circuit 402 detects the peak voltage of the signal Ramp1 and holds the voltage Vpeak at its output. A signal Ramp of the controller 401 is created by adding the voltage offset Vpeak to the signal Ramp1. Vpeak can be varied by selecting a different ratio between R1 and R4 to set a desired Comp signal's voltage level for the converter to switch its operation modes between PWM control and phase-shift control. When the voltage of the signal Comp, which is the duty-cycle command signal, is below Vpeak, the control circuit 400 operates at PWM mode.

The comparator VCMP2 compares input signals Ramp1 and Comp to generate a PWM signal. The PWM signal output is an open-collector circuit. The signal chops the phase-shift controller's outputs OutA, OutB,OutC and OutD to generate four desired gate signals Vgs1,Vgs2,Vgs3 and Vgs4. R6,R7, R8 and R9 are used to limit short circuit currents of the controller 401's outputs when they are pulled low by the comparator VCMP2's output. When the signal Comp's voltage is higher than Vpeak, VCMP2's output is pulled to high by R5 all the time while D1,D2,D3 and D4 block the output from connecting to Vg1-Vg4. A comparator VCMP1 of the controller 401 compares its input signals Ramp and Comp to generate a corresponding phase-shift signal and hence the circuit 400 can switch to phase-shift control mode smoothly. Verse visa, the controller can also switch from phase-shift mode to PWM mode smoothly.

The duty-cycle command signal Comp is an output of an error amplifier EA, whose +input is preferably connected to voltage loop error signal Vfb and whose −input is connected to an current sensing signal $i_s$ by a resistor R4 and Comp by R3. The current sensing signal, $i_s$, is the summation of rectified transformer primary current signals, |ip1| and |ip2, as shown in FIG. 9|. The signal Comp's voltage can be described by the following formula;

$$\text{Voltage of Comp} = V_{fd} \times (R3+R4)/R4 - i_s \times R_s \times R3/R4 \quad (3)$$

where \ stands for logical inversion. It can be seen that by selecting different values of Rs, R3 and R4, the control circuit can operate in either voltage mode or mixed voltage and current mode. When R4 is open, the voltage of Comp is equal to Vfd, that means a voltage mode control. When R4 is scaled down and/or Rs is scaled up, the current $i_s$ has more influence on the control, and the circuit works more like a current mode control.

This invention creates a new control method, which combines both PWM and Phase-Shift controls, for power conversion control applications. FIG. 9 and FIG. 10 show the principle of this control concisely and FIG. 11 provides a detailed control circuit embodiment so that persons skilled in the art would be able to understand better, but it is not meant to be a limited way to implement such a control. Any other circuits created to have such a unique control are within the scope of this invention.

From an understanding of the operation of this invented circuit described above, it can be seen that both circuit configuration and control scheme of this invention are quite different from those of prior arts in general. These new apparatuses and their control method have most advantages of prior arts of half-bridge converters and full-bridge converters. These advantages are summarized as follows, 1. Easier to achieve wide-range ZVS with a constant 50% duty cycle operation for both leading inverter and lagging inverter.
2. Maximizing the energy transmission efficiency from primary to secondary. The invented converter transmits energy to secondary in both D and 1-D time periods, and the voltages across the two power transformers are square waveforms with very limited dead time and in phase with the currents passing through the corresponding windings.
3. More effective utilization of magnetic components. Both inverters' power transformers operate at constant 50% duty cycle. No flux density overhead needs to be reserved in design for voltage regulation during load transience.
4. No circulating current in the power train and higher power conversion efficiency. It is a major drawback of a conventional phase-shifted full-bridge converter or a ZVS PWM full-bridge converter to have such a circulating current during PWM off-state in order to hold sufficient energy for soft switching. The circulating current passes through the whole power train and results in a significant power loss.

5. Low voltage swing rate at lagging bridge switches. A conventional phase-shifted full bridge, a PWM controlled full bridge or an asymmetrical half bridge has a load-depended voltage swing rate at all power switches, while this invented circuit has a low and load-independent voltage swing rate for 50% of voltage changing range at lagging bridge switches. This characteristic of the invented circuit alleviates EMI problem.

6. Low reverse recovery currents at output rectifiers. Resonance inductor Lr provides not only sufficient energy for soft switching, but a low current changing rate for output rectifiers to turn off softly also. It could further improve circuit efficiency and benefit EMI.

7. Minimizing voltage ringing at secondary side rectifiers. Clamping diodes Dc1 and Dc2 can capture most of the energy created by the already reduced reverse recovery current and could reduce the ringing to such a level that no snubber is needed if the leakage inductance of power transformers can be well limited and circuit board can be properly layouted.

8. Minimizing transformer cupper loss. For a same output power, the transformers of this invented converter have relatively lower rms currents since the voltages across the two power transformers are 50% duty-cycle square waveforms with very limited dead time and in phase with the currents passing through the corresponding windings.

9. Utilization of current ripple cancellation to minimize output current ripple.

10. Utilization of current cancellation to minimize current ripple and current rms values of bridge capacitors C1 and C2. The current ripple and rms value at bridge capacitors of this invented converter are much lower than those of any single half bridge converter even operating at 50% duty cycle.

11. Easier to generate SynFET and freewheel MOSFETs' gate signals. Four SynFETs have the same gate signal logic of four bridge switching devices. The logic relationship between freewheel MOSFETs and SynFETs is also simple. No complicated signal processing is required.

12. Suitable for phase shedding. One inverter can be turned off at light load to increase light load efficiency.

Although the invention has been described with reference to several specific embodiments and their corresponding controls, these descriptions are not meant to be constructed in a limiting sense. Various modifications of the disclosed embodiments and the alternative applications of the disclosed control method will become apparent to persons skilled in the art upon reference to the description of the invention. Any such modification or embodiments that fall within the true scope and spirit of the invention will be covered by a corresponding non-provisional patent to be filed.

I claim:

1. A DC/DC converter, comprising:
   a) a first and a second half-bridge DC/AC inverters, each having at least a first and a second isolated AC outputs, wherein each AC output has a first terminal and a second terminal;
   b) a filter, comprising a first inductor, a second inductor and at least a capacitor, wherein one end of the first and the second inductors are tied to a first node at one end of the capacitor, the other ends of the first and second inductors are tied to a second node and a third node respectively, and the other end of the capacitor is tied to a fourth node; and
   c) a first and a second full-wave rectification circuits, each having a first, a second rectifiers and a freewheel device, wherein the freewheel device of the first rectification circuit is tied between the second node and the fourth node, and the freewheel device of the second rectification circuit is tied between the third node and the fourth node; wherein the first rectifier of the first rectification circuit is connected in series with the first AC output of the first half-bridge DC/AC inverter, and the two terminals of the series-connected circuit are tied to the second node and the fourth node respectively; the second rectifier of the first rectification circuit is connected in series with the first AC output of the second half-bridge DC/AC inverter, and the two terminals of the series-connected circuit are tied to the third node and the fourth node respectively; the first rectifier of the second rectification circuit is connected in series with the second AC output of the first half-bridge DC/AC inverter, and the two terminals of the series-connected circuit are tied to the third node and the fourth node respectively; the second rectifier of the second rectification circuit being connected in series with the second AC output of the second half-bridge DC/AC inverter, and the two terminals of the series-connected circuit are tied to the third node and the fourth node respectively, wherein at least one of the first and second half-bridge DC/AC converters is phase shifted with respect the other and are both operated to supply power to an output during a phase shift period D as well as during a freewheeling period 1-D, wherein there is substantially no circulating current in either half-bridge DC/AC inverter and wherein the first and second inductors form a current doubler.

2. The DC/DC converter of claim 1, wherein said rectification circuits use diodes as rectifiers and freewheel devices, having all cathodes of the diodes facing the second node and the third node for a positive DC output and having all anodes of the diodes facing the second node and the third node for a negative DC output.

3. The DC/DC converter of claim 1, wherein said rectification circuits use switching devices as rectifiers and freewheel devices, having all Drain or Collector of the switching devices facing the second node and the third node for a positive DC output and having all Source of the switching devices facing the second node and the third node for a negative DC output.

4. The DC/DC converter of claim 1, wherein said first and a second half-bridge DC/AC inverters, each include:
   a first and a second switching devices that are series connected between two DC input terminals;
   a first and a second bridge capacitors that are series connected between two DC input terminals; and
   d) one transformer with at least one primary winding and two secondary windings, wherein the primary winding has a first terminal and a second terminal, and the first and second terminals of the primary winding are connected to the junction of the series-connected switching devices and the junction of the series-connected bridge capacitors respectively.

5. The first half-bridge inverter of claim 4 further has an inductor inserted between the junction of switching devices and the first terminal of the transformer primary winding of the first half-bridge inverter, and a first clamping diode and a second clamping diode connected in series at the first terminal of the transformer primary winding of the first half-bridge inverter and between DC input terminals.

6. The DC/DC converter of claim 1, wherein said switching devices are MOSFET, IGBT and other semiconductor switching devices.

7. The DC/DC converter of claim 4, wherein said switching devices of the half-bridge inverters are driven by four isolated gate drive signals, which are arranged in phase-shift mode or PWM mode to regulate the converter's output voltage.

8. A method of regulating output voltage of a dual-bridge DC/DC converter, comprising:
 a) connecting a first bridge DC/AC inverter and a second bridge DC/AC inverter in a half-bridge or full-bridge configuration;
 b) providing two full-wave rectification circuits, each including a free-wheel device; and
 c) providing one output filter, having two inductors connected in a current doubler configuration for current ripple cancellation; receiving a duty cycle command from a voltage or current feedback loop, and providing:
  a) phase-shift control generates four gate signals to drive a phase shift between the first and the second bridge DC/AC inverters to regulate the output voltage when the output voltage is above about half of the converter's maximum output voltage, wherein at least one of the first and second half-bridge DC/AC converters is phase shifted with respect to the other and are both operated to supply power to an output during a phase shift period D as well as during a freewheeling period 1-D, wherein there is substantially no circulating current in either half-bridge DC/AC inverter; and
  b) utilizing PWM control and its corresponding four gate signals to drive one of the first and the second bridge DC/AC inverters to regulate the converter output voltage when the output voltage is below about half of the converter's maximum output voltage.

9. A method as claimed in claim 8, wherein at least one bridge DC/AC inverter's phase is shifted to regulate said converter's DC output voltage with said phase-shift control.

10. A method as claimed in claim 8, wherein all switching devices of the bridges operate at about 50% duty cycle with the phase-shift control.

11. A method of regulating output voltage of a dual-bridge DC/DC converter, comprising:
 a) a first bridge DC/AC inverter and a second bridge DC/AC inverter; which are connected in a half-bridge configuration;
 b) two full-wave rectification circuits, each including a free-wheel device; and
 c) one output filter, having two inductors connected in a current doubler configuration for current ripple cancellation; receiving a duty cycle command from a voltage or current feedback loop, and providing:
  a) phase-shift control and its corresponding four gate signals to drive the first and the second bridge DC/AC inverters to regulate the output voltage when the output voltage is above about half of the converter's maximum output voltage; and
  b) PWM control generates four gate signals to drive the first and the second bridge DC/AC inverters to regulate the converter output voltage when the output voltage is below about half of the converter's maximum output voltage;
 wherein a PWM and Phase-Shift controller to implement said method has:
 a) a Vo feedback input, which is usually a voltage loop or average current loop error output;
 b) a dead-time programming input to set a dead time for gate drive outputs;
 c) a phase-shift circuit, producing a duty-cycle control signal, Comp, and four gate signals which are arranged in such a way that at least one of the two bridge DC/AC inverters can shift its phase;
 d) a saw waveform generator, which is used to produce a first ramp signal for PWM control;
 e) a peak voltage detector, which detects a peak voltage of the saw waveform;
 f) a signal adder, whose inputs are the saw signal and the peak voltage detected by the peak voltage detector and whose output is a second ramp signal for phase-shift control;
 g) a PWM generator, which is the output of a comparator by comparing the first ramp and the duty cycle control signal, Comp;
 h) four gate drive outputs to drive bridge switches, which are the outputs of AND Logic Circuit for phase-shift circuit output gate signals and the PWM signal;
 i) an optional current input signal, which is typical the summation of the rectified transformers primary currents of the first and second bridge DC/AC inverters;
 j) four optional gate drive signals (Vgss1,Vgss2,Vgss3 and Vgss4) for synchronous rectification circuit, which have the same logic as the corresponding four gate drive signals for the two bridge DC/AC bridges and can be disabled when the controller operate in PWM mode; and
 k) two optional gate drive signals (Vgss5 and Vgss6) for freewheel switching devices, which typically have the following logic, Vgss5=logical inversion (Vgss1+Vgss3) and Vgss6=logical inversion (Vgss2+Vgss4); wherein the two optional gate drive signals for the synchronous rectification circuit and the two optional gate drive signals for the freewheel switching devices can be disabled when the controller operates in PWM mode.

12. A method of regulating output voltage of a dual-bridge DC/DC converter, comprising:
 a) a first bridge DC/AC inverter and a second bridge DC/AC inverter; which are connected in a half-bridge configuration;
 b) two full-wave rectification circuits, each including a free-wheel device; and
 c) one output filter, having two inductors connected in a current doubler configuration for current ripple cancellation; receiving a duty cycle command from a voltage or current feedback loop, and providing:
  a) phase-shift control and its corresponding four gate signals to drive the first and the second bridge DC/AC inverters to regulate the output voltage when the output voltage is above about half of the converter's maximum output voltage; and
  b) PWM control generates four gate signals to drive the first and the second bridge DC/AC inverters to regulate the converter output voltage when the output voltage is below about half of the converter's maximum output voltage;
 wherein a controller to implement said method has:
 a) a phase-shift controller, having
  (1) an input EAP, which is an error amplifier +input,
  (2) an input EAN, which is the error amplifier −input,
  (3) an output, Comp, which is the error amplifier output,
  (4) a saw signal input, Ramp2, for phase-shift control,
  (5) a ramp signal programming pin CT, which is connected to a switching frequency programming capacitor, and
  (6) four full-bridge gate drive signals, which are able to operate in phase-shift mode;

b) a current sensing input, which is converted to a voltage signal after passing a grounded resistor;
c) a duty-cycle command signal, which is connected to EAP typically;
d) a voltage follower transistor, whose Base and Collect are connected to CT and a voltage source respectively;
e) a voltage divider, comprising two series connected resistors, one end of which is connected to the Source of the voltage follower transistor; and the other end is tied to a ground GND, and the junction of the two resistor is an signal output, Ramp1;
f) a peak voltage detector, whose input connects to the signal Ramp1
g) (d) a voltage adder, which adds the signal Ramp1's peak voltage to the signal Ramp1 to generate another ramp signal Ramp2
h) (e) a comparator comparing signal Ramp1 with signal Comp to generate an PWM signal and
i) a AND logic circuit to AND the PWM signal with each of said phase-shift controller's four outputs by a diode to generate desired PWMs for the bridge inverters; wherein a resistor is needed to connected between the error amplifier's output, Comp, and its −input, EAN, for voltage mode control; and one more resistor is needed to connect the current sensing input to EAN for current mode control.

13. The DC/DC converter of claim 1 wherein the two half-bridges operate normally at a 50 percent duty cycle.

14. The DC/DC converter of claim 13 wherein the two half-bridges operate normally open loop.

15. The DC/DC converter of claim 13 wherein at least one of the two half-bridge inverters is operated utilizing pulse width modulation (PWM) control during light load conditions.

* * * * *